United States Patent [19]  [11] Patent Number: 4,916,464
Ito et al.  [45] Date of Patent: Apr. 10, 1990

[54] LIGHT EMITTING DIODE ARRAY PRINT HEAD HAVING NO BONDING WIRE CONNECTIONS

[75] Inventors: Katsuyuki Ito; Naoji Akutsu; Yuhei Itasaka, all of Tokyo, Japan

[73] Assignee: Oki Electric Industry Co., Ltd., Tokyo, Japan

[21] Appl. No.: 347,818

[22] Filed: May 4, 1989

Related U.S. Application Data

[63] Continuation-in-part of Ser. No. 189,132, Apr. 22, 1988, abandoned, and a continuation-in-part of Ser. No. 193,681, May 13, 1988, abandoned.

[30] Foreign Application Priority Data

Apr. 22, 1987 [JP] Japan .................................. 62-59840
May 15, 1987 [JP] Japan .................................. 62-71772

[51] Int. Cl.⁴ ........................ G01D 9/42; G01D 15/06
[52] U.S. Cl. ................................... 346/107 R; 346/160
[58] Field of Search ................ 346/107 R, 108, 160; 358/296, 300, 302; 355/1, 67, 69, 70; 357/17, 30; 362/800, 84, 31; 313/500; 372/45; 350/96.10, 96.17, 96.18, 96.24

[56] References Cited

U.S. PATENT DOCUMENTS

| | | | |
|---|---|---|---|
| 4,549,784 | 10/1985 | Inokuchi | 355/1 |
| 4,633,271 | 12/1986 | Segawa | 346/107 R |
| 4,807,047 | 2/1989 | Sato | 346/107 R |
| 4,820,013 | 4/1989 | Fuse | 350/96.10 |
| 4,827,920 | 2/1989 | Yoritomo | 346/107 R |

FOREIGN PATENT DOCUMENTS

59-8074 2/1984 Japan .

*Primary Examiner*—Bruce A. Reynolds
*Assistant Examiner*—Scott A. Rogers
*Attorney, Agent, or Firm*—Wenderoth, Lind & Ponack

[57] ABSTRACT

An LED array print head for an electrophotographic printer includes: LED array device packages each being loaded with an array of LEDs individually connected to a first major surface of the LED package by first solder joints; LED driver packages each loaded with a driver circuit connected to a first major surface of the driver package by second solder joints; and an optically transparent insulative substrate with a first major surface carrying conductive leads adapted to electrically connect the LEDs and driver circuits. The LED and driver packages are mounted on the substrate in such an orientation that the first major surfaces of the packages face the first major surface of the substrate and the first and second solder joints are connected to the conductive leads of the substrate.

16 Claims, 4 Drawing Sheets

LIGHT EMITTING DIODE ARRAY PRINT HEAD HAVING NO BONDING WIRE CONNECTIONS

This is a continuation-in-part of application Ser. No. 07/189,132, filed Apr. 22, 1988, abandoned June 7, 1989 and of application Ser. No. 07/193,681, filed May 13, 1988, abandoned May 20, 1989.

BACKGROUND OF THE INVENTION

1. Field of the Invention

The present invention relates to electrophotography and, more particularly, to a light emitting diode (LED) array print head applicable to a printer which uses an electrophotographic procedure.

2. Description of the Prior Art

A family of printers of the type adopting the principle of electrophotography includes a laser beam printer which uses a laser beam and an LED printer which uses an LED array, as well known in the art. All the printers of this type are equipped with an optical print head which serves as a one-dimensional or linear scanning optical writing device for producing an electrostatic latent image on the surface of a photoconductive drum. The optical print head using a laser beam and the optical head using an LED array as stated above are generally referred to as a laser beam scanner and an LED array print head, respectively.

A laser beam scanner scans a photoconductive element one-dimensionally at a high speed by a laser beam which is reflected by a mirror which is in turn rotated by a motor. Such a scanner, therefore, needs a substantial period of time to reach a constant speed after the start of operation, resulting in a construction which is of disproportionately large size. In contrast, an LED array print head which is implemented with a one-dimensional array of LEDs is capable of electronically scanning a photoconductive element with no movable members included therein. For this reason, the LED array print head substantially eliminates the need for the buildup time after the start of operation which is particular to the laser beam scanner as stated above, and in addition it can be constructed to be of a small size.

In an LED array print head, LEDs arranged in an array are selectively energized in response to a data signal which is fed to the print head from a processing system or like external equipment. Light issuing from particular ones of the LEDs is focused by a rod lens array onto the surface of a photoconductive element, so that an image represented by the light, such as an electrostatic latent image, is formed on the photoconductive element.

An LED array print head includes a plurality of LED array devices each being constituted by a linear array of numerous LEDs. The LED array devices are individually fixed to, for example, a ceramic substrate via a common electrode for LEDs which is provided on a surface opposite to the surface where light emitting portions of the LEDs are positioned. Independent electrodes of each device which are associated one-to-one with the LEDs are connected by bonding wires to conductive leads which are provided on the substrate by printing technology. Also mounted on the substrate are drivers which are adapted to drive the LEDs and each of which is constructed into an integrated circuit, connecting terminals of the drivers being also connected to printed conductive leads by bonding wires.

An LED array print head has a number of LEDs each of which is associated with a respective one of a number of pixels which are sequentially defined in a main or horizontal scanning direction of an image to be printed out. This gives rise to certain problems, however. Specifically, since such a number of LEDs have to be accompanied by a corresponding number of independent electrodes and therefore by a corresponding number of bonding wires, a prohibitive number of assembling steps are required, thus resulting in an expensive print head. Another problem is derived from the fact that while the common electrode associated with the LEDs is provided on the opposite side to the light emitting side of the LEDs, the independent electrodes each being associated with a respective one of the LEDs are located on the same side as the light emitting side of the LEDs. In this condition, assuming that the independent electrodes of the LED array device are connected to conductive leads of an optical fiber plate, then extra means such as bonding wires have to be used to connect the LEDs. This not only aggravates the difficulty of assembly but also adds to the cost.

A method of mounting an LED array without relying on bonding wire which are disadvantageous for the reasons discussed above is disclosed in Japanese Patent Publication No. 8074/1984. The method disclosed in this Patent Publication consists in mounted an LED array on an optical fiber plate in such an orientation that the light emitting suface of the LED array faces the optical fiber plate. However, when an optical fiber plate is used as an imaging optical element, the allowable distance between the optical fiber plate and a photoconductive drum is severely limited so that toner particles may be deposited on the plate.

SUMMARY OF THE INVENTION

It is therefore an object of the present invention to provide an LED array print head which reduces the number of assembling steps and, when applied to a printer, minimizes the possibility of toner being deposited.

In accordance with one embodiment of the present invention, there is provided a light emitting diode array print head which includes a first package having opposite major surfaces on one of which an array of LEDs is positioned, that major surface provided with an electrode conductor which is connected to the LEDs. The electrode conductor is provided with first solder bumps which are made of a thermally fusible alloy. A second package is loaded with a driver circuit for driving the array of LEDs. There is provided on one major surface thereof second solder bumps which are also made of a thermally fusible alloy and are connected to the driver circuit. A substrate formed of an optically transparent insulative material carries on one major surface thereof conductive leads for electrically connecting the LEDs and the driver circuit. The first and second packages are mounted on the substrate in such an orientation that such one major surfaces of the two different kinds of packages face the above-mentioned major surface of the substrate. The first and second solder bumps are connected to the conductive leads.

In accordance with another embodiment of the present invention, there is provided an LED array print head including a first package having opposite major surfaces on one of which an array of LEDs is positioned. That major surface is provided with first electrode conductors each of which is connected to one electrode of a respective one of the LEDs. The other major surface of the first package is provided with a second electrode conductor which is commonly connected to the other electrode of all of the LEDs. The first electrode conductors are each provided with first solder bumps which are made of a thermally fusible alloy. A second package is loaded with a driver circuit for driving the array of LEDs. One of the opposite major surfaces of the second package is provided with second solder bumps which are made of a thermally fusible alloy and are connected to the driver circuit. A substrate is formed of an optically transparent insulative material and has opposite major surfaces on one of which conductive lead means for electrically connecting the LEDs and the driver circuit is provided. Resilient biasing means is provided for biasing the other major surface of the first package toward the substrate and includes a first resilient and conductive flat plate. A free end portion of the conductive flat plate is electrically connected to the second electrode conductor and biases the first package. The first and second packages are mounted on the substrate in such an orientation that the one major surface of the first package and the one major surface of the second package face the one major surface of the substrate. The first and second solder bumps are connected to the conductive lead means.

In accordance with the present invention, there is also provided an electrophotographic printer which include an LED array print head having a plurality of first packages and a plurality of second packages which are arranged in parallel to each other along the longitudinal axis of an elongate substrate. The arrays of LEDs of the first packages are aligned along the above-mentioned longitudinal axis. Focusing optics extend along the longitudinal axis for focusing light which is emitted by the array of the LEDs via the substrate onto the photoconductive surface of a photoconductive drum.

In the above construction, light issuing from the LEDs of the LED array devices which are selectively driven by the driver circuits is transmitted through the transparent substrate and then through a rod lens array or like focusing optics onto, for example, a photoconductive drum of an electrophotographic printer. Therefore, it is not necessary to connect electrodes of the LED array devices one by one to the conductive patterns on the substrate by bonding wires. Also, since the drivers are connected via solder bumps to the substrate on which the LED array devices are mounted, connecting terminals of the drivers do not have to be connected one by one by bonding wires. These features in combination promote each assembly of an LED array print head. cl

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 3:
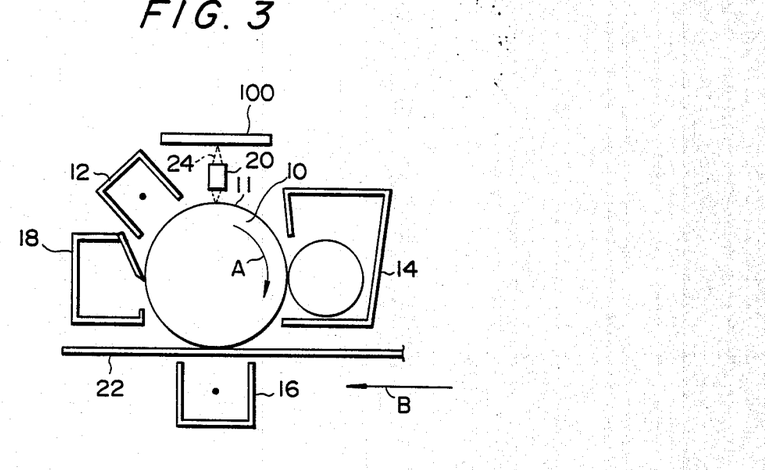
FIG. 3 is a schematic view of an exemplary electrophotographic printer to which the LED array print head of FIG. 1 is applied.

Reference first will be made to FIG. 3 for describing an example of electrophotographic printers to which an LED array print head in accordance with the present invention is advantageously applicable. The printer shown in FIG. 3 includes a photoconductive drum 10 which is rotatable in a direction indicated by an arrow A. Sequentially arranged around the cylindrical surface 11 of the drum 10 in the direction A are a charger 12, a developing unit 14, a transferring unit 16, and a cleaning unit 18. The charger 12 is adapted to uniformly charge the surface 11 of the drum 10 to a predetermined polarity. As shown, a rod lens array or like focusing optics 20 and an LED array print head 100 are disposed between the charger 12 and the developing unit 14. A predetermined gap is defined between the transferring unit 16 and the drum 10 so that a recording medium such as a paper sheet 22 may be fed therethrough as indicated by an arrow B.

The LED array print head 100 is electrically connected to a processing system or like external equipment so as to receive a data signal which is produced by the latter. LEDs 102, FIG. 4, which are included in the array 100 are selectively energized by the data signal to emit light. The light from particular ones of the LEDs 102 is focused by the optics 20 onto the surface 11 of the drum 10, whereby an electrostatic latent image represented by the light 24 is produced on the drum surface 11.

As the drum 10 is rotated, the latent image provided on the drum surface 11 by the above procedure is developed by toner which is supplied from the developing unit 14. The resulting toner image is transferred to the paper sheet 22 by the transferring unit 16 and then fixed thereon by a fixing unit, not shown. The paper sheet 22 with the toner image fixed thereon is driven out of the printer as a print. The surface 11 of the drum 10 used is cleaned by the cleaning unit 18 to be prepared for another printing cycle.

Figure 1:
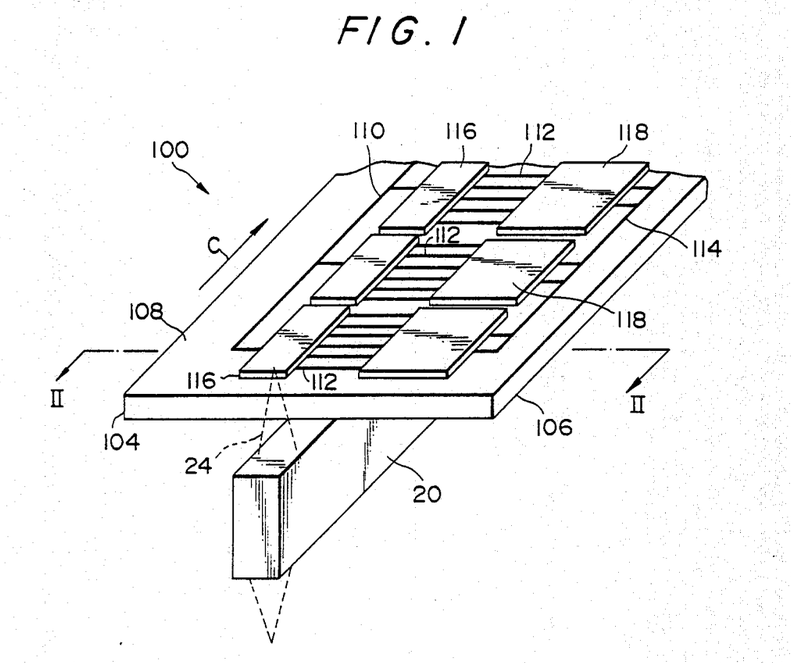
FIG. 1 is a perspective view showing an LED array print head according to a first embodiment of the present invention.
Figure 2:
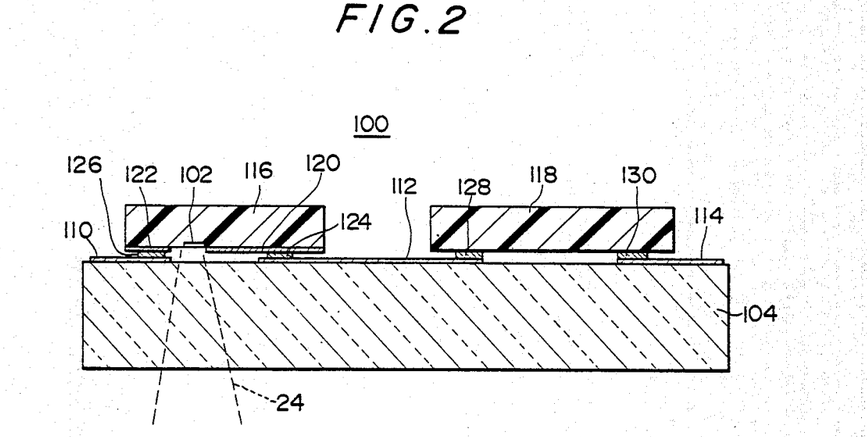
FIG. 2 is a fragmentary enlarged section along line II—II of FIG. 1.

Reference now will be made to FIGS. 1 and 2 illustrating a first embodiment of the present invention.

Referring to FIG. 1, the LED array print head 100 in accordance with the present invention includes a generally elongate and rectangular flat substrate 104 which is made of an optically transparent insulating material, e.g. glass. One of the opposite major surfaces of the transparent substrate 104, i.e. the lower major surface 106 as viewed in FIG. 1, faces the focusing optics 20. The other or upper major surface 108 of the substrate 104 carries thereon printed conductive leads 110, 112 and 114 each being configured in a desired circuit pattern, as illustrated. LED array devices 116 and drivers 118 which are individually associated with the devices 116 are mounted on the upper major surface 108 of the substrate 104 and rigidly connected to the substrate 104.

Figure 4:
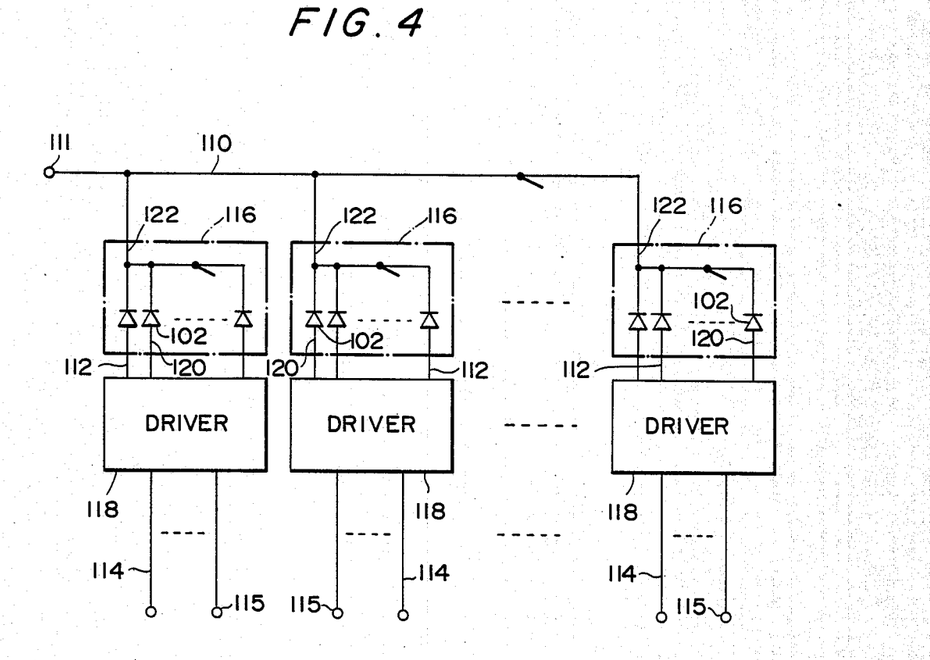
FIG. 4 is a schematic block diagram representative of an equivalent circuit of the LED array print head shown in FIG. 1.

As represented by an equivalent circuit in FIG. 4, each LED array device 116 has numerous, such as forty-six, LEDs 102 which are arranged linearly in a longitudinal direction C of the substrate 104 and are received in a generally flat rectangular package. One electrode of all of the LEDs 102, i.e. the cathodes thereof, are interconnected within the package as shown in FIG. 4. Further, the cathodes of the LEDs 102 received in each package are connected to a printed conductive lead, or common electrode, 110 provided on the substrate 104 together with the cathodes of the LEDs 102 which are received in the other packages. The printed conductive lead 110 is connected via a terminal 111 to an external circuit. The other electrode of all of the LEDs 102, i.e. the anodes in this particular embodiment, are individually led out to the exterior of the package and connected to associated ones of printed conductive leads, or independent electrodes, 112 which are also provided on the substrate 104. Associated one-to-one with the LED array devices 116, the drivers 118 are individually connected to signal lines 114 for receiving a data signal from external equipment. Constructed into an integrated circuit, each driver 118 decodes the data signal from the external equipment so as to selectively drive its associated LEDs 102. The signal lines 114 are connected to the external equipment via individual terminals 115. It is to be noted that FIG. 1 only schematically shows the external appearance of the LED array print head 110 and, therefore, the numbers and shapes of the printed conductive leads 110, 112 and 114 are not always the same as those which are installed in practice.

More specifically, as shown in FIG. 2, each package of LED array device 116 is mounted on the transparent substrate 104 in such an orientation that each LED, i.e. an LED light emitting portion 102, faces the substrate 104. Independent electrode conductors 120 and a common electrode conductor 122 are rigidly connected to that major surface of the package 116 which faces the substrate 104, as illustrated. The independent electrode conductor 120 and the common electrode conductor 122 are respectively connected to the cathodes and the anodes of the LED light emitting portions 102. Provided on the independent electrode conductors 120 and the common electrode conductor 122 are solder bumps 124 and 126, respectively. These solder bumps 124 and 126 are made of an alloy which is fusible by heat. To fix the package 116 to the substrate 104, the independent electrodes 120 are individually connected to one end of the printed conductive leads 112 via the solder pumps 124 while the common electrode 122 is connected to the end of the printed conductive lead 110 via the solder bumps 126.

Constructed into an integrated circuit, each LED array driver 118 for driving its associated LED array device 116 is mounted in a generally flat rectangular package, as shown in FIG. 1. As shown in FIG. 2, the driver package 118 has a driver circuit all the connecting terminals of which are exposed to the outside on one of the opposite major surfaces of the driver package 118, solder bumps 128 and 130 being provided on those connecting terminals. Again, the solder bumps 128 and 130 are made of a thermally fusible alloy. The driver package 118 is loaded on the substrate 104 with the solder bumps 128 and 130 facing the substrate 104, and it is rigidly connected to the other terminal of the printed conductive leads 112 assigned to the independent electrodes and the printed conductive leads 114 via the solder bumps 128 and 130, respectively. It should be born in mind that integrated circuit chips which are individually sealed in the packages 116 and 118 as well as connecting lines associated with the chips are not shown in FIG. 2 for the sake of simplicity.

In the assembly of the LED array print head 100, the transparent substrate 104 on which the printed conductive leads 110, 112 and 114 are provided each in a desired circuit pattern is prepared. This is followed by preparing the LED array packages 116 and providing the solder bumps 124 and 126 on, respectively, the electrodes 120 and 122 of the packages 116. Likewise, the solder bumps 128 and 130 are formed on the connecting terminals of each driver package 118. Subsequently, the packages 116 and 118 are loaded in the substrate 104 while being oriented as shown in FIG. 2, whereafter the solder bumps 124, 126, 128 and 130 are heated. After the solder bumps 124, 126, 128 and 130 have been melted by the heat, they are cooled with the result that the packages 116 and 118 are firmly connected to the substrate 104 via the solder bumps. It follows that the solder bumps 126, 14, 128 and 130 respectively associated with the electrode conductors 122 and 120 of the LED array device package 116 and the connecting terminals of the driver package 118 establish ohmic contact with the printed conductive leads 110, 112 and 114.

In operation, when the LED light emitting portions 102 of any of the LED array device 116 are selectively driven by a signal which is outputted by their associated driver 118, light issuing from the light emitting portions 102 is transmitted through the transparent substrate 104 and then focused by the optics 20 onto the surface 11 of the photoconductive element 10. This causes the previously stated sequence of printing steps to occur.

In summary, in accordance with this embodiment of the present invention, both the LED independent electrodes and the LED common electrode of an LED array device are disposed on the same side of an LED array device package as LED light emitting portions and are connected via solder bumps to printed conductive leads which are provided on a transparent substrate. Likewise, a driver associated with the LED array device is connected via solder bumps to printed conductive leads which are provided on the substrate. This eliminates the need for wiring and assembly operations which rely on bonding wires and thereby simplifies the production steps to reduce the production cost.

In addition, light issuing from the LED light emitting portions is transmitted through the transparent substrate and then focused by optics to expose a photoconductive drum imagewise. Hence, the optics can be spaced apart from the drum by a distance which is great enough to minimize the deposition of toner on the optics.

Figure 5:
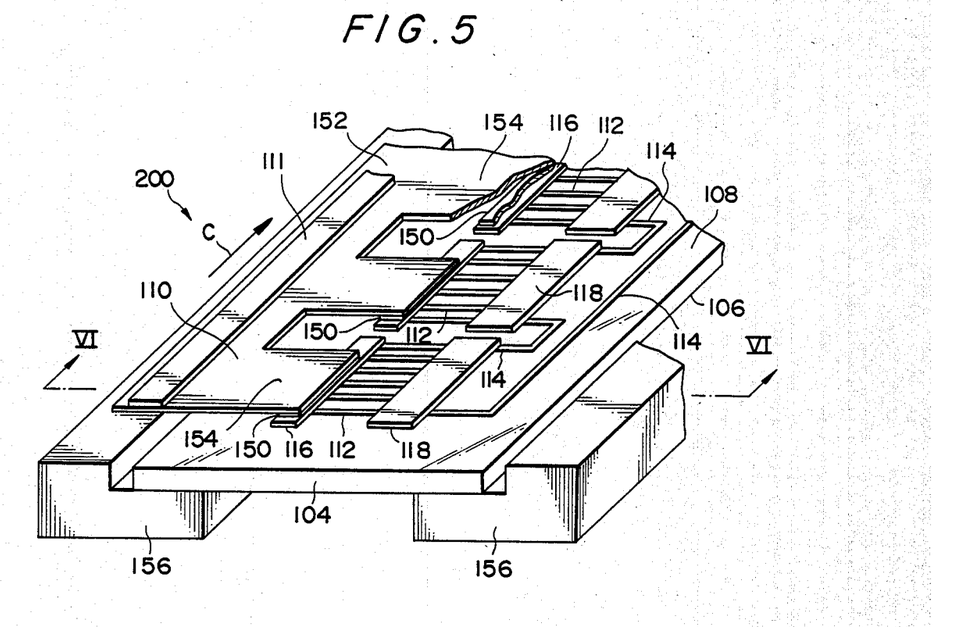
FIG. 5 is a perspective view showing an LED array print head according to a second embodiment of the present invention.
Figure 6:
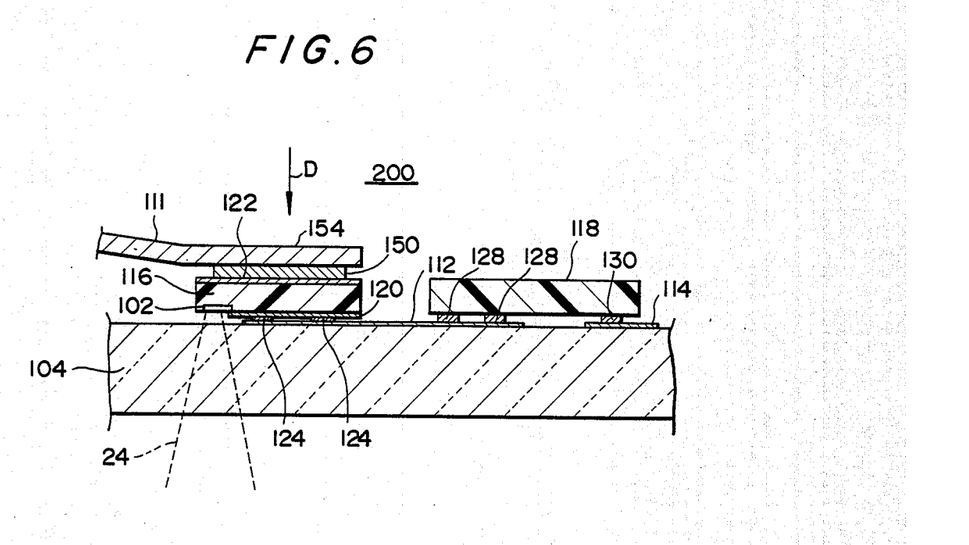
FIG. 6 is a fragmentary enlarged section along line VI—VI of FIG. 5.

Reference now will be made to FIGS. 5 and 6 illustrating a second embodiment of the present invention.

Referring to FIG. 5, the LED array print head 200 in accordance with this embodiment of the present invention includes a generally elongate and rectangular flat substrate 104 which is made of an optically transparent insulating material, e.g. glass. One of the opposite major surfaces of the transparent substrate 104, i.e. the lower major surface 106 as viewed in FIG. 5, faces the focusing optics 20, FIG. 3. The other or upper major surface 108 of the substrate 104 carries thereon conductive leads 112 and 114 each being configured in a desired circuit pattern, as illustrated. LED array devices 116 and drivers 118 which are individually associated with the devices 115 are mounted on the upper major surface 108 of the substrate 104 and rigidly connected to the substrate 104.

With reference again to the equivalent circuit in FIG. 4, each LED array device 116 has numerous, such as forty-six, LEDs 102 which are arranged linearly in a longitudinal direction C of the substrate 104 and are received in a generally flat rectangular package. One electrode of all of the LEDs 102, e.g. the cathodes thereof, are interconnected within the package as shown in FIG. 4. Further, the cathodes of the LEDs 102 received in each package are connected to a common lead 110, in this case in the form of a power supply bar provided above the substrate 104, together with the cathodes of the LEDs 102 which are received in the other packages. The power supply bar 110 is connected via a terminal 111 to an external circuit. The other electrode of all of the LEDs 102, i.e. the anodes in this particular embodiment, are individually led out to the exterior of the package and connected to associated ones of printed conductive leads, or independent electrodes, 112 which are provided on the substrate 104. Associated one-to-one with the LED array devices 116, the drivers 118 are individually connected to signal lines 114 for receiving a data signal from external equipment. Constructed into an integrated circuit, each driver 118 decodes the data signal from the external equipment so as to selectively drive its associated LEDs 102. The signal lines 114 are connected to the external equipment via individual terminals 115. It is to be noted that FIG. 5 only schematically shows the external appearance of the LED array print head 200 and, therefore, the numbers and shapes of the power supply bar 110 and printed conductive leads 112 and 114 are not always the same as those which are installed in practice.

More specifically, as shown in FIG. 6, each package of LED array device 116 is mounted on the transparent substrate 104 in such an orientation that each LED, i.e. an LED light emitting portion 102 faces the substrate 104. Independent electrode conductors 120 are rigidly connected to that major surface of the package 116 which faces the substrate 104, as illustrated. The independent electrode conductors 120 are connected to the anodes of the LED light emitting portions 102. Provided on the independent electrode conductors 120 are solder bumps 124. These solder bumps 124 are made of an alloy which is fusible by heat. To fix the package 116 to the substrate 104, the independent electrodes 120 are individually connected to one end of the printed conductive leads 112 via the solder pumps 124.

A common electrode conductor 122 is rigidly mounted on that major surface of the package 116 which is remote from the substrate 104, as illustrated. The common electrode conductor 122 has substantially the same flat rectangular configuration as the package 116 and is electrically connected to the cathodes of the LED light emitting portions 102. A flat piece 150 is mounted on the common electrode conductor 122 and is also provided with a flat rectangular shape. This piece 150 may advantageously be made of rubber in which conductive particles are dispersed, i.e. so-called conductive rubber. As shown in FIG. 5, the power supply bar 110 of this particular embodiment has a generally comb-like flat configuration which includes a base portion 152 and a plurality of arms 154. The base portion 152 is mechanically supported by a structural body 156 while being electrically connected to a terminal 111 which is provided on the base portion 152. The power supply bar 110 is formed advantageously of a material having good electrical and thermal conductivity as well as mechanical resiliency, e.g. metal. The free end portions of the arms 154 of the power supply bar 110 are individually held in contact with resilient flat plates 150 which are mounted on the packages 116. Resembling a tooth of a comb, each arm 154 of the power supply bar 110 serves as a leaf spring and constantly biases the common electrode conductor 122 downward as indicated by an arrow D in FIG. 6 by way of the resilient plate 150, which is associated with the arm 154. This establishes ohmic contact between the power supply bar 110 and the common electrode conductor 122. In this instance, the resilient plate 150 functions to damp the pressure force which is exerted by the power supply bar 110 to the package 116. If desired, the arms 154 of the power supply bar 110 may be held in direct contact with the common electrode conductor 122 without the intermediary of the resilient plates 150.

Forming a part of the frame of an electrophotographic printer, for example, the structural body 156 plays two different roles: mechanically supporting the substrate 104 and thermally coupling the substrate 104 and the power supply bar 110. Specifically, heat generated in the packages 116 and 118 during operation is transferred to the structural body 156 via the substrate 104. Further, heat generated in each package 116 is partly transmitted to the structural body 156 via the common electrode conductor 122, conductive plate 150 and power supply bar 110. The terminal on the power supply bar 110 is connected to an external circuit, e.g. to ground. Hence, the cathodes of the LEDs 102 are electrically connected to the external circuit.

Constructed into an integrated circuit, each LED array driven 118 for driving its associated LED array device 116 is mounted in a generally flat rectangular package, as shown in FIG. 5. As shown in FIG. 6, the driver package 118 has a driver circuit all the connecting terminals of which are exposed to the outside on one of the opposite major surfaces of the driver package 118, solder bumps 128 and 130 being provided on those connecting terminals. Again, the solder bumps 128 and 130 are made of a thermally fusible alloy. The driver package 118 is loaded on the substrate 104 with the solder bumps 128 and 130 facing the substrate 104, and it is rigidly connected to the other terminal of the printed conductive leads 112 assigned to the independent electrodes and the printed conductive leads 114 via the solder bumps 128 and 130, respectively. It should be born in mind that integrated circuit chips which are individually sealed in the packages 116 and 118 as well as connecting lines associated with the chips are not shown in FIG. 6 for the sake of simplicity.

In a manufacturing process of the LED array print head 200, the transparent substrate 104 on which the printed conductive leads 110, 112 and 114 are provided each in a desired circuit pattern is prepared. This is followed by preparing the LED array packages 116 and providing the solder bumps 124 on the electrodes 120 of the packages 116. Likewise, the solder bumps 128 and 130 are formed on the connecting terminals of each driver package 118. Subsequently, the packages 116 and 118 are loaded on the substrate 104 while being oriented as shown in FIG. 6, whereafter the solder bumps 124, 128 and 130 are heated. After the solder bumps 124, 128 and 130 have been melted by the heat, they are cooled with the result that the packages 116 and 118 are firmly connected to the substrate 104 via the solder bumps. It follows that the solder bumps 124, 128 and 130 respectively associated with the electrode conductors 120 of the LED array device package 116 and the connecting terminals of the driver package 118 establish ohmic contact with the printed conductive leads 112 and 114.

The substrate 104 loaded with the packages 116 and 118 by the above procedure is mounted on the structural body 156, as shown in FIG. 5. Then, the power supply bar 110 and the terminal 111 are mounted on and rigidly connected to the subassembly of the substrate 104 and structural body 156, completing the LED array print head 200. Since the free end portions of the arms 154 of the power supply bar are resiliently urged against the flat plates 150 from above, ohmic contact between the power supply bar 110 and the common electrode 122 is ensured.

In operation, when the LED light emitting portions 102 of any of the LED array device 116 are selectively driven by a signal which is outputted by their associated driver 118, light issuing from the light emitting portions 102 is transmitted through the transparent substrate 104 and then focused by the optics 20 onto the surface 11 of the photoconductive element 10. This causes the previously stated sequence of printing steps to occur. During operation, heat generated in the packages 116 and 118 is effectively radiated to the structural body 156 via the substrate 104. In addition, the heat in the packages 116 is radiated to the structural body 156 via the power supply bar 110.

Figure 7:
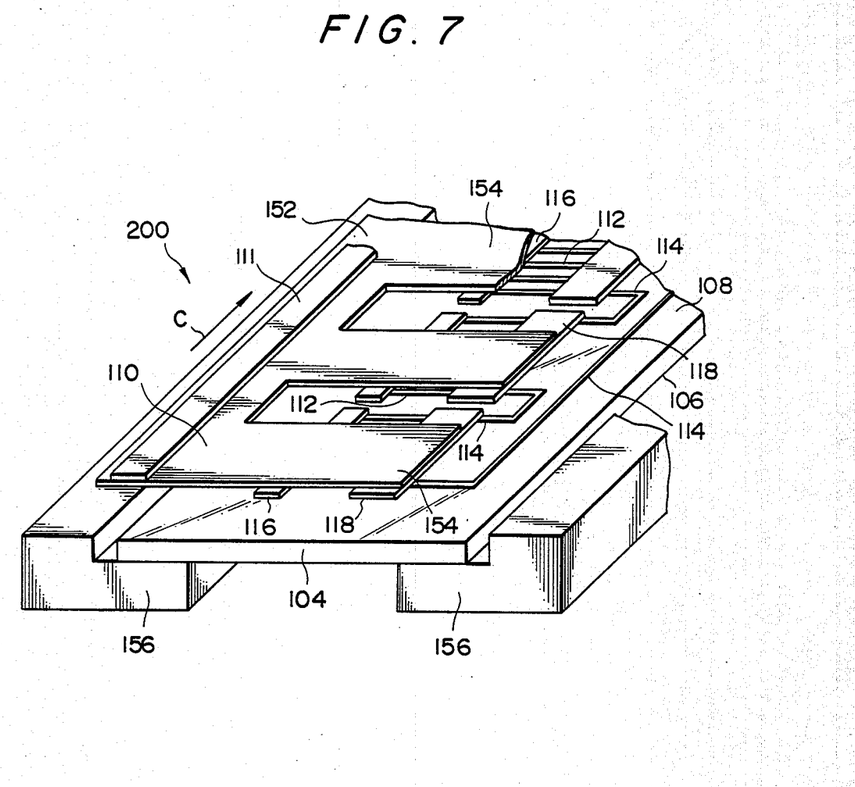
FIG. 7 is a perspective view, similar to FIG. 5, showing an alternative arrangement of this embodiment of the present invention.

Referring to FIG. 7, a modification of this embodiment of the present invention is illustrated. As shown, the arms 154 of the power supply bar 110 are individually extended to such an extent that their free ends make contact with and press those major surfaces of the driver packages 118 which are remote from the transparent substrate 104. The power supply bar 110, therefore, is connected to the driver packages 118. Alternatively, the driver packages 118 may be electrically and thermally coupled independently of the LED packages 116 by a member which is separate from and similar to the power supply bar 110.

In summary, in accordance with this embodiment of the present invention, an LED array device having independent electrodes which are provided on the same side of a package as LED light emitting portions and a common electrode which is provided on the opposite side to the LED light emitting portions, the solder bumps which are formed on the independent electrodes and an IC driver device having solder bumps which are formed on its connecting terminals are mounted on a transparent substrate by bonding the solder bumps. A power supply bar in the form of a leaf spring is abutted against the LED common electrode to establish electrical connection to external terminals. Likewise, a driver associated with the LED array device is connected via solder bumps to printed conductive leads which are provided on the substrate. This eliminates the need for the wiring and assembly which rely on bonding wires and thereby simplifies the production steps to reduce production cost.

In addition, light issuing from the LED light emitting portions is transmitted through the transparent substrate and then focused by optics to expose a photoconductive drum imagewise. Hence, the optics can be spaced apart from the drum by a distance which is great enough to minimize the deposition of toner on the optics. Further, the power supply bar also serves the function of heat conducting means and therefore contributes a great deal to the simplification of a heat radiating structure.

It is to be noted that the application of the LED array print head of the present invention is not limited to an electrophotographic printer which has been shown and described. It is advantageously applicable even to a printer of the type in which imagewise light from an LED array print head is directly recorded on a photographic paper or like photosensitive recording medium.

While the present invention has been described with reference to particular illustrative embodiments, it is not to be restricted by such embodiments but only by the appended claims. It is to be appreciated that those skilled in the art can change or modify the illustrated embodiments without departing from the scope and spirit of the present invention.

We claim:

1. A light emitting diode array print head comprising:
   a first package having opposite major surfaces on a first of which an array of light emitting diodes are positioned, said first major surface being provided with electrode conductor means which is connected to said light emitting diodes, said electrode conductor means being provided with first solder bumps which are made of a thermally fusible alloy;
   a second package loaded with a driver circuit for driving said array of light emitting diodes, a first of opposite major surface of said second package being provided with second solder bumps which are made of a thermally fusible alloy and are connected to said driver circuit;
   a substrate formed of an optically transparent insulative material and having opposite major surfaces on a first of which are provided conductive lead means for electrically connecting said light emitting diodes and said driver circuit; and
   said first package and said second package being mounted on said substrate in such an orientation that said first major surface of said first package and said first major surface of said second package face said first major surface of said substrate, said first solder bumps and said second solder bumps being connected to said conductive lead means.

2. A print head in accordance with claim 1, wherein said substrate has a generally elongate shape, and said array of light emitting diodes extends linearly in a longitudinal direction of the elongate shape of said substrate.

3. A print head in accordance with claim 2, wherein a plurality of first packages and a plurality of second packages are arranged parallel to each other along a longitudinal axis of said elongate shape of said substrate, said arrays of light emitting diodes of said first packages being aligned along said longitudinal axis.

4. An electrophotographic printer comprising:
   an LED array print head in accordance with claim 3 located above a photoconductive surface of a photoconductive drum such that said longitudinal axis of said elongate shape extends substantially parallel to a longitudinal axis of said drum; and
   focusing optics extending along said longitudinal axis of said elongate shape for focusing light which is emitted by said arrays of light emitting diodes via said substrate onto said photoconductive surface of said drum.

5. A print head in accordance with claim 1, wherein said conductive lead means comprises:
   first conductive leads connecting anodes of said array of light emitting diodes individually to said driver circuit;
   a second conductive lead connecting cathodes of said array of light emitting diodes commonly to an external circuit; and third conductive leads connecting said driver circuit to an external circuit.

6. A print head in accordance with claim 1, further comprising optics for focusing light which is emitted by said array of light emitting diodes via said substrate.

7. A print head in accordance with claim 1, wherein said electrode conductor means comprises a plurality of first electrode conductors each of which is connected to one electrode of a respective one of said light emitting diodes, and further comprising a second electrode conductor provided on a second major surface of said first package and commonly connected to the other electrode of all of said light emitting diodes, and resilient biasing means for biasing said other major surface of said first package toward said substrate, said biasing means including a first resilient and conductive flat plate which has a free end portion electrically connected to said second electrode conductor and biasing said first package.

8. A print head in accordance with claim 7, wherein said biasing means comprises a second resilient and conductive flat plate which is interposed between said second electrode conductor and said free end portion to electrically interconnect said second electrode and said free end portion and to damp a pressure force which is exerted by said free end portion on said first package.

9. A print head in accordance with claim 7, wherein the first conductive flat plate is thermally conductive so that heat generated in said first package is at least partly radiated via said first conductive flat plate.

10. A print head in accordance with claim 9, wherein said free end portion is extended to such an extent that said free end portion makes contact with the other major surface of said second package which is remote from said substrate, whereby said first conductive flat plate is thermally connected to said second package.

11. A print head in accordance with claim 7, wherein said substrate has a generally elongate shape, and said array of light emitting diodes extends linearly in a longitudinal direction of the elongate shape of said substrate.

12. A print head in accordance with claim 11, wherein a plurality of first packages and a plurality of second packages are arranged parallel to each other along a longitudinal axis of said elongate shape of said substrate, said arrays of light emitting diodes of said first packages being aligned along said longitudinal axis.

13. An electrophotographing printer comprising:
an LED array print head in accordance with claim 12, located above a photoconductive surface of a photoconductive drum such that said longitudinal axis of said elongate shape extends substantially parallel to a longitudinal axis of said drum; and
focusing optics extending along said longitudinal axis of said elongate shape for focusing light which is emitted by said arrays of light emitting diodes via said substrate onto said photoconductive surface of said drum.

14. An electrophotographic printer in accordance with claim 13, wherein said first conductive flat plate is thermally conductive and is thermally connected to a structural body of said printer, whereby heat generated in said first packages is at least partly radiated via said first conductive flat plate.

15. A print heat in accordance with claim 7, wherein said one electrode of each of the light emitting diodes is an anode and said other electrode is a cathode.

16. A print head in accordance with claim 15, wherein the conductive lead means comprises first conductive leads connecting said anodes of said array of light emitting electrodes individually to said driver circuit, and second conductive leads connecting said driver circuit to the external circuit and said first conductive flat plate connects said cathodes of said array of light emitting diodes commonly to the external circuit.

* * * * *